United States Patent
Neau et al.

(10) Patent No.: US 12,409,682 B2
(45) Date of Patent: Sep. 9, 2025

(54) SURFACE TEXTURE FOR A TIRE TREAD

(71) Applicant: COMPAGNIE GENERALE DES ETABLISSEMENTS MICHELIN, Clermont-Ferrand (FR)

(72) Inventors: Xavier Neau, Clermont-Ferrand (FR); Romain Berthier, Clermont-Ferrand (FR); Thomas Lescur, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 18/267,947

(22) PCT Filed: Dec. 10, 2021

(86) PCT No.: PCT/FR2021/052271
§ 371 (c)(1),
(2) Date: Jun. 16, 2023

(87) PCT Pub. No.: WO2022/129745
PCT Pub. Date: Jun. 23, 2022

(65) Prior Publication Data
US 2024/0051347 A1 Feb. 15, 2024

(30) Foreign Application Priority Data
Dec. 18, 2020 (FR) .................................... 2013680

(51) Int. Cl.
B60C 11/03 (2006.01)
B29D 30/06 (2006.01)

(52) U.S. Cl.
CPC ...... B60C 11/0318 (2013.01); B29D 30/0606 (2013.01); B60C 11/033 (2013.01); *B29D 2030/0612* (2013.01)

(58) Field of Classification Search
None
See application file for complete search history.

(56) References Cited

U.S. PATENT DOCUMENTS

D214,412 S * 6/1969 Hammond .................. D12/574
9,403,407 B2 8/2016 Amano
(Continued)

FOREIGN PATENT DOCUMENTS

EP 2799250 A1 11/2014
FR 650283 A * 1/1929 ........... B60C 11/032
(Continued)

OTHER PUBLICATIONS

JP 2002-248911 Machine Translation; Umemoto, Hitoo (Year: 2002).*
(Continued)

*Primary Examiner* — Justin R Fischer
*Assistant Examiner* — Nicholas J Weiler
(74) *Attorney, Agent, or Firm* — VENABLE LLP

(57) ABSTRACT

The surface state of the treads of tires cured in a vulcanization mold manufactured by 3D printing represents an optimal compromise between cost, appearance, and grip performance of the tire. The texture is formed by an arrangement of contiguous elements of pyramidal shape, each element of pyramidal shape having a base of parallelogram type positioned on the tread surface, and an apex situated at a normal distance H from the base in the range 0.15 mm to 0.5 mm.

6 Claims, 3 Drawing Sheets

(56) References Cited

U.S. PATENT DOCUMENTS

2011/0220256 A1\* 9/2011 Furusawa ........... B60C 11/1376
152/209.17
2014/0345765 A1 11/2014 Amano

FOREIGN PATENT DOCUMENTS

| | | | |
|---|---|---|---|
| GB | 443862 A1 \* | 3/1936 | |
| JP | 7-257111 A | 10/1995 | |
| JP | 2002248911 A \* | 9/2002 | |

OTHER PUBLICATIONS

FR 650283 Machine Translation; Gruneisen, Paul-Emilie (Year: 1929).\*

International Search Report dated Apr. 5, 2022, in corresponding PCT/FR2021/052271 (4 pages).

\* cited by examiner

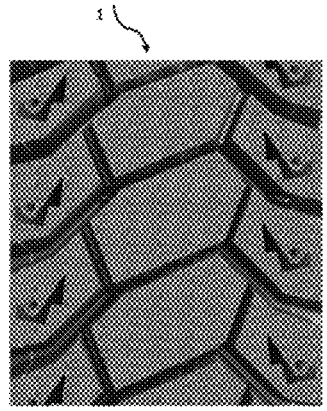
Figure 1-A
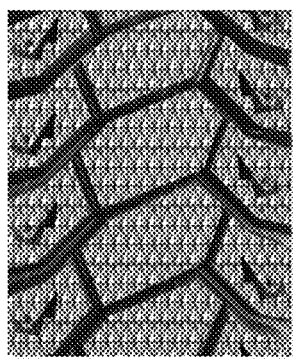
Figure 1-B
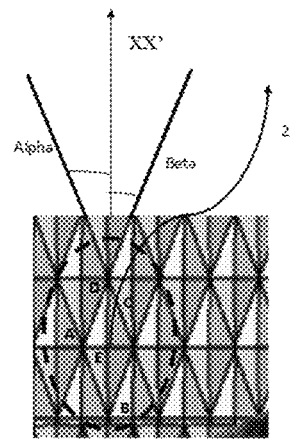
Figure 1-C
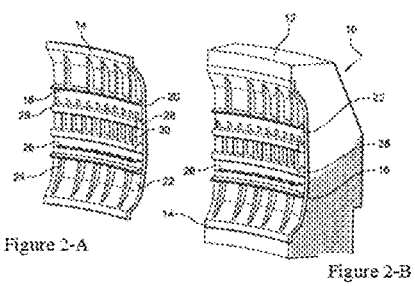
Figure 2-A
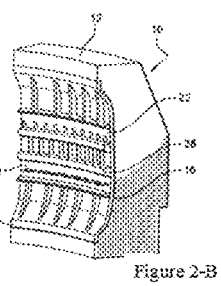
Figure 2-B
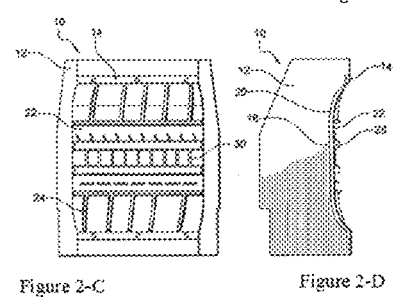
Figure 2-C
Figure 2-D
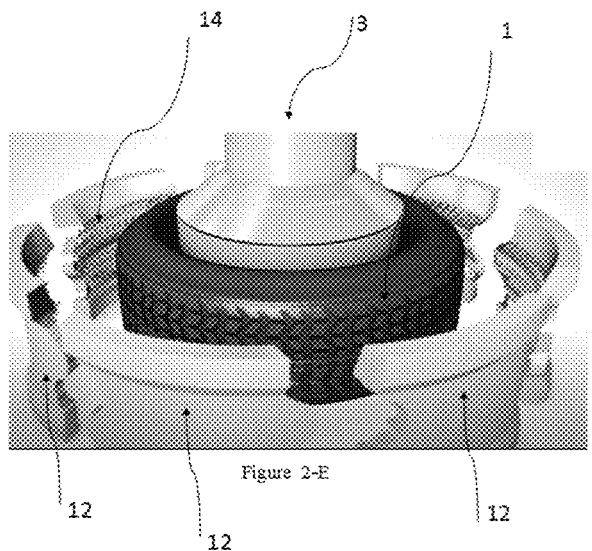
Figure 2-E

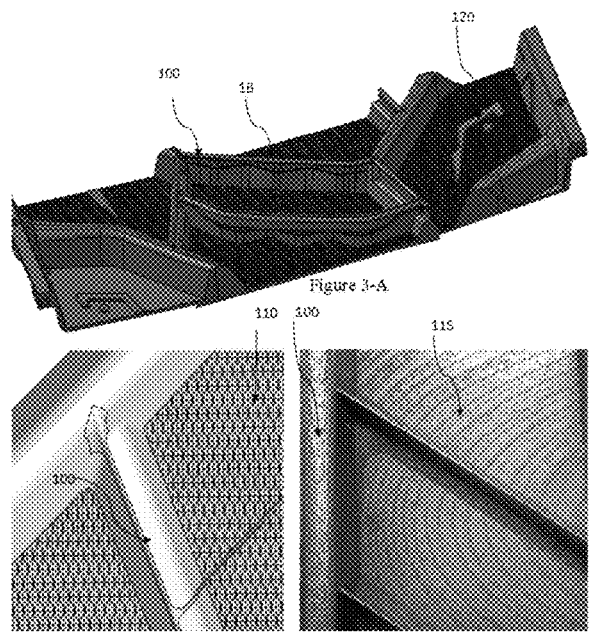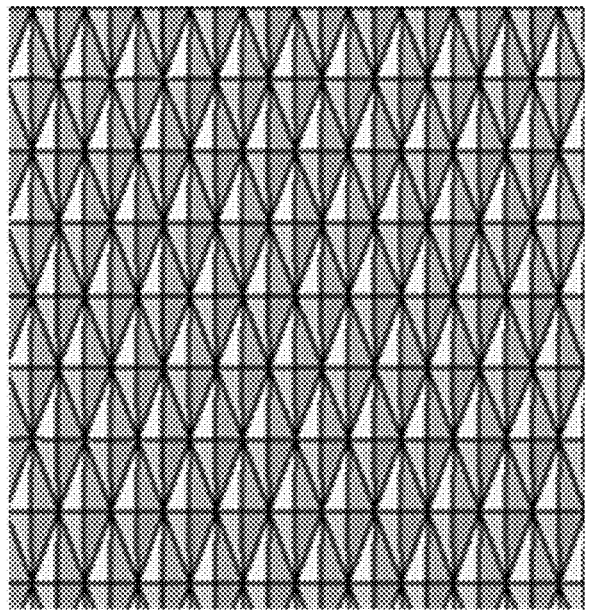
Figure 3-A
Figure 3-B    Figure 3-C    Figure 3-D
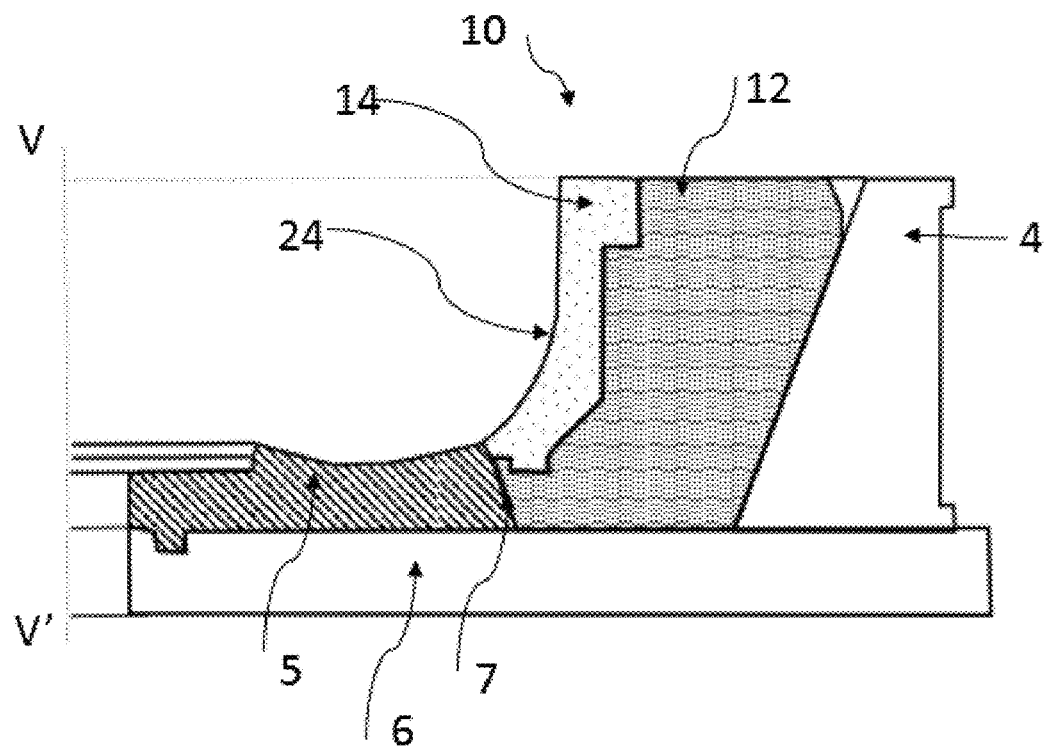
Figure 4

SURFACE TEXTURE FOR A TIRE TREAD

FIELD OF THE INVENTION

The present invention relates to the surface state of the treads of the tyres cured in a vulcanization mould manufactured by printing in three dimensions (3D printing).

The invention proposes a texture of the tread surface of the tread of a tyre that represents an optimal compromise between cost, appearance, and grip performance of the tyre.

Definitions

By convention, a frame of reference (O, XX', YY', ZZ') is defined, the centre O of which coincides with the geometric centre of the tyre, the circumferential direction XX', axial direction YY' and radial direction ZZ' refer to a direction tangential to the tread surface of the tyre in the direction of rotation, to a direction parallel to the axis of rotation of the tyre, and to a direction orthogonal to the axis of rotation of the tyre, respectively.

Radially inner and radially outer mean closer to and further away from the axis of rotation of the tyre, respectively.

Axially inner and axially outer mean closer to and further away from the equatorial plane of the tyre, respectively, the equatorial plane of the tyre being the plane that passes through the middle of the tread of the tyre and is perpendicular to the axis of rotation of the tyre.

A tyre comprises a crown intended to come into contact with the ground via a tread, the two axial ends of which are connected via two sidewalls to two beads that provide the mechanical connection between the tyre and the rim on which it is intended to be mounted.

Generally, those skilled in the art define the tread of a tyre mainly with the aid of the following design features: the tread surface, which makes it possible to define the total width of the tread, and the tread pattern.

The "tread surface" of the tread means the surface that groups together all the points of the tyre that will come into contact with the ground under normal running conditions. These points that will come into contact with the ground belong to the contact faces of the blocks. For a tyre, the "normal running conditions" are the use conditions defined, for example, by the ETRTO (European Tyre and Rim Technical Organisation) standard. These use conditions specify the reference inflation pressure corresponding to the load-bearing capacity of the tyre as indicated by its load index and its speed rating. These use conditions can also be referred to as "nominal conditions" or "working conditions".

PRIOR ART 3D printing or additive manufacturing groups together processes for mass manufacturing parts by addition or agglomeration of material, by stacking successive layers. 3D printing makes it possible to produce a real object: a designer draws the 3D object using a computer-aided design (CAD) tool. The 3D file obtained is processed by specific software that organizes the cutting into slices of the various layers necessary for the production of the part. The cutting is sent to the 3D printer, which deposits or solidifies the material layer by layer until the final part is obtained. The principle remains close to that of a conventional 2D printer, except for this major difference: it is the stacking of the layers that creates the volume.

The raw material is in the form of a powder, which is generally spherical, with a D90 particle size that is usually between 20 and 45 μm. A D90 particle size means that 90% of the particles of the powder analysed have a diameter of between 20 and 45 μm. Powder distribution in the machine is done either via a feed tank of which the level is raised by a piston, or via a hopper. The powder is then spread by a roller or a scraper. The thickness of the layer varies depending on the material, the machine and the power of the laser, but remains of the order of 20 to 100 μm.

In order to melt a layer of powder, a source projects a beam of energy onto the surface of this layer of powder, in the form of a spot at which such melting occurs. The beam of energy is then controlled in such a way as to scan the surface in order to spread this melting over the entire surface of the layer. By way of example, the beam of energy can be a laser that in general has a power of 200 W to 1000 W.

Often, the process takes place in a chamber under a controlled atmosphere (neutral gas, generally argon+control of the residual oxygen content) so as to avoid oxidation phenomena. The gas is chosen depending on the nature of the material, but it is usually argon or nitrogen. Manufacturing is initiated from a plate; the parts will be welded to this plate at the end of manufacturing and this will require a cutting operation.

Conventionally, the beam of energy scans various zones of the surface in a longitudinal direction and in an outbound sense alternating with a return sense.

It has in particular been proposed for the energy source to be driven in such a way that the spot travels over each zone not with a translational movement that is perfectly rectilinear in the longitudinal direction but in a movement made up of a translation in the longitudinal direction and of an oscillatory (wobbling) movement. The oscillatory movement notably oscillates in a transverse direction so as to enlarge the melt pool.

Various oscillatory movements have been proposed.

One of them, which is generally called "circular mode", is such that the spot of the laser follows a trajectory comprising loops offset from each other in a longitudinal direction of the plate.

The surface states of the parts manufactured by 3D printing with scanning of a beam of energy as described above are characterized by a succession of circular ridges that give an unsightly appearance to the part, which can hinder the success of the marketing thereof.

This phenomenon can be observed for tyres vulcanized in a mould manufactured by 3D printing. The tread surface of the tyre reproduces the reverse pattern of the surface of the mould with circular grooves resulting from the moulding.

The inventors have set themselves the objectives of improving the surface state of the moulded tyre without negatively impacting the industrial manufacturing cost, and without negatively affecting the grip performance while at the same time having an appearance that better meets customer expectations.

The invention also relates to the field of tyre vulcanizing moulds, in particular moulds of the sectored type.

A sectored mould comprises a plurality of separate parts that, when brought closer together, delimit a moulding space that is virtually toroidal. In particular, a sectored mould has two lateral shells for moulding the sidewalls of the tyre, and a plurality of peripheral sectors, situated between the shells, for moulding the tread of the tyre. All of these parts are brought closer together by suitable kinematics, using a desired mechanism. The green blank of the future tyre has to be firmly pressed and held against the mould so as to obtain geometric dimensions and a precise architecture and so as to imprint the tread pattern of the tread.

In order to form the tread patterns of the tread, the sectors of the mould comprise elements protruding from the radially inner surface of the sectors, these elements forming a negative of the tread patterns to be moulded on the tread of the tyre. In the following, this negative is referred to as "lining".

Consequently, the lining is therefore formed by all the moulding elements of the tread comprising the surface of the mould that is intended to be the tread surface, and the projecting elements intended to form cuts on the tread of the vulcanized tyre (circumferential and axial grooves, sipe lamellae, etc.). The lining also encompasses recessed elements such as for example the wear indicators of the tyre.

Noting that the same tyre size can be vulcanized with a plurality of different tread patterns depending on the intended uses, designing the mould making a distinction between on the one hand the removable lining and on the other hand the fastening supports offers numerous advantages.

Thus, to adapt a mould to the manufacture of a tyre having given tread patterns, it is sufficient to successively attach the various lining elements to each support block of the sectors of the mould.

More specifically, a lining as used in the invention is characterized in that it comprises:
- a skin comprising opposing first and second surfaces, the first surface being intended to be in contact with a support block of a mould for a tyre, the thickness of the skin being between 0.25 and 3 millimetres, and
- a plurality of protruding and recessed lining elements of the second surface of the skin, the lining elements being intended to form tread patterns of a part of a radially external surface of a tyre,
- the skin and the protruding and recessed elements of the lining being made in one piece by 3D printing.

The lining, which comprises protruding and recessed elements and which is intended to be the tread pattern of the tread, has in some cases a highly complex shape depending on the desired performance properties of the tyre. Manufacturing by 3D printing is suitable for this kind of complexity in that it is based on computer-aided design modelling of the lining. Specifically, the laser can be driven by a computer comprising a model of the part and the part can then be manufactured by successive sintering of superimposed layers of powder.

The inventors have used this manufacturing technology to find a solution to the objective of improving the surface state of the tyre obtained by moulding without negatively impacting the industrial manufacturing cost or the grip performance while at the same time having an appearance that better meets customer expectations.

SUMMARY OF THE INVENTION

This objective has been achieved by a tyre provided with a tread of which portions of the tread surface that are intended to be in contact with the ground comprise a texture formed by an arrangement of contiguous elements of pyramidal shape, each element of pyramidal shape having a base of parallelogram type positioned on the tread surface, and an apex situated at a radial distance H from the base, said base being defined by:
- a first pair of mutually parallel sides spaced apart from one another by a first pitch P1, and forming an angle Alpha with a circumferential direction;
- a second pair of mutually parallel sides spaced apart from one another by a second pitch P2, and forming an angle Beta with the circumferential direction of the tyre;
- the first pair of parallel sides and the second pair of parallel sides, which form, at their intersection, the vertices of the bases of parallelogram type, constituting a mesh of the portions of the tread surface,
- the angle Alpha is in the range [15°; 75°], the angle Beta is in the range [−75°; −15°], and the normal distance from the apex H to the base is in the range [0.15 mm; 0.5 mm].

The texture of the tread of a tyre of the invention constitutes a mesh of the portions of the tread surface containing neither cuts, nor protruding parts, nor recessed parts.

The texture that can be observed on the tread comprises a first set of mutually parallel segments forming an angle Alpha with the circumferential direction of between [15°; 75°], and a second set of pairwise parallel segments forming an angle Beta with the circumferential direction of between [−75°; −15°]. The points at the intersection of the segments are the nodes of the mesh and correspond to the vertices of parallelograms that constitute the base of a pyramidal shape of which the apex is situated in the radially outer direction passing the centre of the parallelogram.

In some embodiments, the apex may be situated radially towards the inside of the parallelogram so as to form a recessed inverted pyramid.

The angles Alpha and Beta determine the orientation of the parallelograms in the plane of the tread. When Alpha and Beta are close to 15° in terms of absolute value, the pattern of the texture is generally oriented in the circumferential direction, and when Alpha and Beta are close to 75°, the pattern of the texture is oriented in the axial direction of the tread.

The pitches P1 and P2 determine the area of the base of the pyramidal shape. They correspond to the half-length of the diagonals of the base parallelograms.

Preferentially, the first pitch P1 and/or the second pitch P2 is constant, and even more preferentially, the angle Beta is equal in terms of absolute value to the angle Alpha. In this embodiment, the parallelograms are rhombuses. The texture has uniformity and symmetry both in the circumferential direction and in the transverse direction.

Advantageously, the first pitch P1 of the first pair of sides of the base parallelogram is less than or equal to 2*H/Tan (Alpha). Again advantageously, the second pitch P2 of the second pair of sides of the base parallelogram is less than or equal to 2*H/Tan(Beta).

Advantageously, the texture of the portions of the tread surface has a density of elements of pyramidal shape that is greater than or equal to 10 elements per square centimetre.

A second subject of the invention is a mould for vulcanizing a tyre that comprises a lining that reproduces the texture of the first claim after vulcanization of the tyre. The particular feature of this mould is that it has a lining manufactured by 3D printing.

More specifically, the invention also relates to a vulcanization mould for a tyre that is able to cooperate with a curing press, said mould having two shells that each ensure the moulding of a sidewall of the tyre and a ring of sectors that ensures the moulding of the tread of the tyre, each sector having a support and a moulding lining situated radially on the inside of the support, said lining having a skin comprising opposing first and second surfaces, the first surface being intended to be in contact with a support block of the mould, the second surface of the skin having a plurality of protruding and recessed elements intended to form the tread pattern of the tread of a tyre after vulcanization, characterized in that the second surface of the skin of the lining, between the protruding elements and the recessed elements, comprises a texture made of an arrangement of recessed contiguous elements of pyramidal shape, each element of pyramidal shape having a base of parallelogram type positioned on the skin, and an apex situated at a distance H1 from the base, radially towards the inside of the lining.

The distance H1 from the apex of the pyramidal shape to the base of parallelogram type positioned on the skin of the lining is determined so that, after vulcanization of the tyre in the mould, this distance is equal to the distance H defined above.

Preferentially, the texture of the skin of the lining comprises a density of recessed elements of pyramidal shape that is greater than or equal to 10 elements per square centimetre.

Finally, a third subject of the invention is a method for manufacturing by 3D printing that is used for the production of the lining of the mould.

The invention proposes a method for manufacturing, by 3D printing, the lining of a mould for vulcanizing a tyre, said lining having a skin comprising opposing first and second surfaces, the first surface being intended to be in contact with a support block of the mould, the second surface of the skin having a plurality of protruding and recessed elements intended to form the tread pattern of the tread of a tyre after vulcanization, said 3D printing method involving the following steps:

a. Scanning by a beam of energy projected by a laser generator onto the second surface of the skin so as to create a first series of mutually parallel segments forming an angle Alpha with the circumferential direction of between [15°; 75°];

b. Scanning of the beam of energy projected by a laser generator onto the second surface of the skin so as to create a second series of mutually parallel segments forming an angle Beta with the circumferential direction of between [−15°; −75°];

c. The points at the intersection of the segments of the first series and of the second forming the nodes of a mesh and corresponding to the vertices of parallelograms, scanning of the beam of energy projected by a laser generator at the centre of each parallelogram so as to hollow out a pyramidal shape of which the apex is positioned in the normal direction towards the inside of the lining.

DESCRIPTION OF THE FIGURES

The invention will be understood better from reading the following description, which is given solely by way of example and with reference to the drawings, in which:

FIG. 1-A is an extract of the tread obtained after vulcanization of the tyre, depicting the texture proposed by the invention. FIG. 1-B is the same depiction as FIG. 1-A but seen from the computer-aided design (CAD) side. View 1-C is an enlargement of FIG. 1-B that highlights the construction of the texture of the invention.

FIGS. 2-A to 2-E illustrate the terminology of moulds that is commonly used. FIG. 1-A is a perspective view of a mould lining, FIG. 2-B is a perspective view of a mould sector comprising a support block and the lining shown in FIG. 2-A fastened to said support block; FIG. 2-C is a top view of the sector in FIG. 2-B, FIG. 2-D is a cross-sectional view of the sector in FIG. 2-B; finally FIG. 2-E is an example of a mould with its sectors comprising the linings that are attached thereto.

FIGS. 3-A, 3-B, and 3-C depict partial views of mould linings obtained by 3D printing. Graph 3-B is an enlargement of view 3-A to highlight the texture proposed by the invention, in comparison with conventional textures depicted in FIG. 3-C that are formed of patterns in the form of concentric circles. FIG. 3-D is an enlargement of FIG. 3-B with the texture pattern of the invention showing the texture with elements of pyramidal shape.

FIG. 4 depicts a mould of which the lining is manufactured by 3D printing.

DETAILED DESCRIPTION OF THE INVENTION

Figure 5:
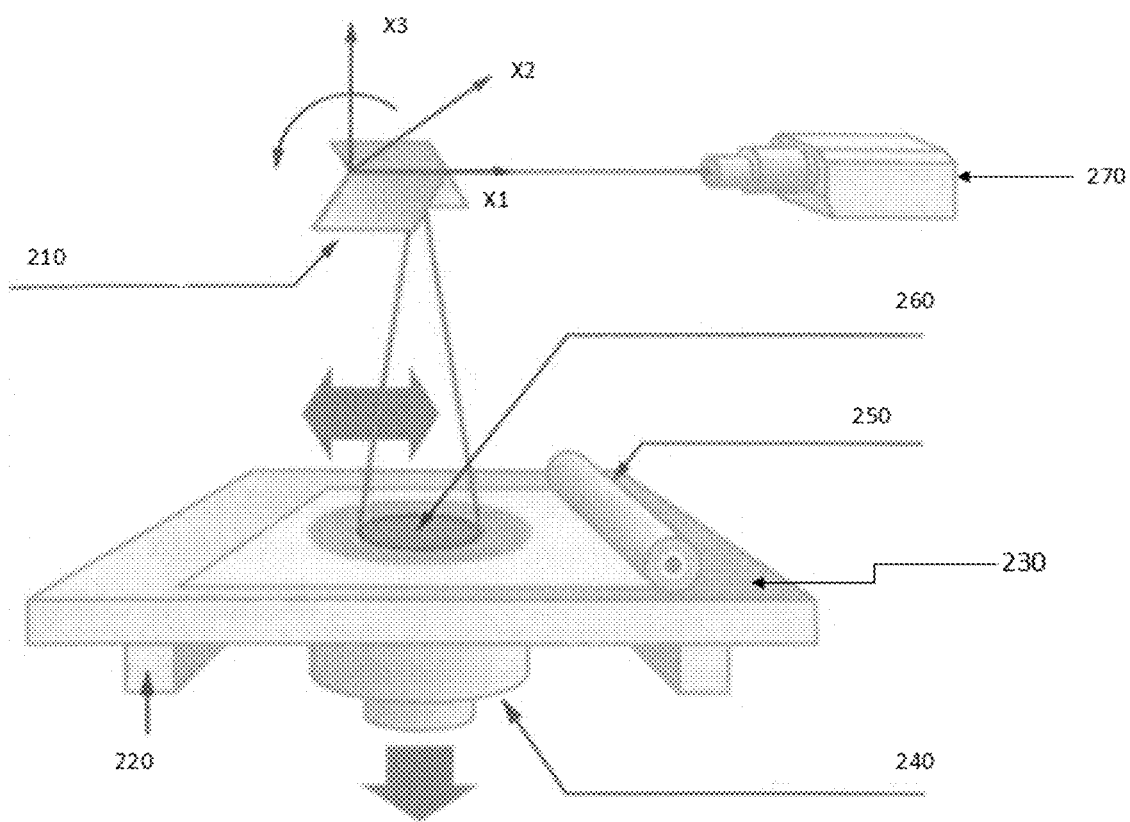
FIG. 5 depicts the diagram of the principle of operation of the manufacturing by 3D printing. The lining with its components, skin, protruding elements and recessed elements are made in one piece by 3D printing.

FIG. 1-C shows the details of the construction of the pattern of the tread of the tyre with the general reference 1. The pattern of pyramidal shape (ABCDE), represented by the reference 2, of which the base is the parallelogram (ABCD), can be seen. The sides AB and DC are parallel and form an angle Alpha with a circumferential direction (XX'); as for the sides DA and CD, they are also parallel and form an angle Beta with this same circumferential direction. The apex E is positioned radially on the outside of the tread surface. FIG. 1-B is the computer-aided design model of the surface of the tread from the pattern shown in FIG. 1-C, and finally FIG. 1-A is an extract of the tread surface after vulcanization of the tyre.

FIG. 2-A depicts a portion of lining 14 limited to the sector shown in FIG. 2-B. More specifically, a lining 14 as used in the invention is characterized in that it comprises:

a skin 18 comprising opposing first 20 and second 22 surfaces, the first surface being intended to be in contact with a support block 12 of a mould for a tyre, the thickness of the skin 18 being between 0.25 and 3 millimetres for a mould for vulcanizing a passenger-vehicle tyre, and a plurality of protruding and recessed lining elements 24 of the second surface 22 of the skin, the lining elements 24 being intended to form tread patterns of a part of a radially external surface of a tyre.

FIG. 2-B depicts a sector, denoted by the general reference 10, of a sectored mould for vulcanization of a tyre. The sector 10 comprises a support block 12 and a lining 14 attached to the support block 12.

The support block 12 is formed by a solid steel block comprising in particular a support surface 16 intended to receive the lining 14. The support surface 16 is substantially smooth and has a shape that substantially matches the overall curvature of the tread of the tyre to be moulded.

The lining 14 comprises a skin 18 containing opposing first 20 and second 22 surfaces, the first surface 20 being intended to be in contact with the support surface 16 of the support block 12.

The skin 18 further comprises a plurality of lining elements 24 protruding from the second surface 22, the lining elements 24 being intended to form the tread patterns of a part of the tread of the tyre to be moulded.

Among the lining elements 24, there are distinguished in particular lamellae 26 intended to form circumferential slots in the tread of the tyre, and circumferential ridges 28 intended to form a longitudinal groove on the tread of the tyre.

The various ridges 28 are connected by axial lamellae 30 so as to form a network of lining elements 24.

FIG. 2-E depicts the mould of general reference 3 in the open position. The shells that are intended to mould the sidewalls of the tyre are not shown. Each sector is generally made of steel or cast iron. The moulding lining 14 is generally made of an aluminium alloy. In a known manner, a plurality of sectors 10 are arranged side by side circumferentially around the axis of symmetry V-V' of the mould and form an annulus, the sectors being able to move radially by virtue of a device comprising a ring (4) that encompasses the sectors. The ring 4 is shown in FIG. 4.

FIGS. 3-A, 3-B, 3-C and 3-D relate to the mould obtained by 3D printing. FIG. 3-A is a portion of the lining 14 having the skin 18 with the texture of the invention but on the mould side, i.e. it is the reverse pattern of that of the tread of the tyre. References 100 and 120 are examples of protruding and recessed elements that will imprint the tread after moulding.

FIG. 3-B is an enlargement of the lining portion in FIG. 3-A, which more clearly shows the pattern of the invention 110 borne by the skin 18 of the lining 14.

FIG. 3-C depicts the conventional surface state obtained by 3D printing with concentric circles revealing ridges 115 that imprints the tyre after vulcanization. FIG. 3-A is precisely the improvement of this surface state 3-C.

FIG. 4 illustrates a partial cross-sectional view of a vulcanization mould sector 10 in which the main parts of the mould can be seen. The lining 14 is fastened to a support 12, generally made of steel or cast iron. The lining 14 is generally made of an aluminium alloy and bears the negative of the tread pattern of the tread of the tyre. A ring 4 encircles the sectors 10 so as to allow the operations of opening and closing the mould. The shell 5 ensures the moulding of the sidewalls and comprises an interface 7 with the lining 14. The shell 5 and the ring 4 are borne by a plate 6. The ring 4 has a radially inner surface of frustoconical shape that cooperates with the radially outer surface of frustoconical shape of the sectors 10.

The lining 14 is manufactured by 3D printing. The pattern in FIG. 3-D formed around a pyramidal shape 2 is reproduced on the surface 22 of the skin 18 between the protruding and recessed lining elements 24.

FIG. 5 shows the schematic diagram of the manufacturing by 3D printing.

Prior to manufacturing by 3D printing, a first step consists in modelling the part to be manufactured using computer-aided design (CAD) software that defines the morphological constraints of the part to be produced. The next step is importing the previous data into software making it possible to define the strategy for development of the object, and the parameters of the method, then instructions are transmitted to the machine for manufacturing by 3D printing for the production of the object in its physical form.

Thus, in FIG. 5, the part to be produced is manufactured gradually on a removable plate 230 of which the location is identified by a local axis system (X1, X2, X3). The plane (X1, X2) is parallel to the plane of the plate 230, and the direction X3 is orthogonal to this same plane. The plate 230 is fed with powder via the feed channel 220; a system for equalizing the powder layer 250 spreads the powder over a uniform thickness. The laser generator 270 directs the laser beam onto an optical system 210. The laser is moved over the plate 230 using an optical chain 210 that is in fact a system of oscillating mirrors driven by the data from the CAD. The manufactured part 260 is welded to the support 240.

In order to produce the lining of the mould, which generates the texture of the tread surface of the tyre, the laser of the method for manufacturing by 3D printing traces, on the skin of the lining, a first set of mutually parallel segments forming an angle Alpha with the circumferential direction of between [15°; 75° ], and a second set of pairwise parallel segments forming an angle Beta with the circumferential direction of between [−75°; −15° ]. The points at the intersection of the segments are the nodes of the mesh and correspond to the vertices of the parallelograms. Each parallelogram is hollowed out at its centre by the laser so as to form an inverted pyramid.

The main parameters of the method for manufacturing by 3D printing that are used for the invention are: the power of the laser [100-1000 W], the scanning speed of the laser [0.1-5 mm·s−1], the diameter of the laser spot [50-200 µm], which can be adjusted by adjusting the distance between the surface of the powder layer and the focal point of the laser, the thickness of the powder layer [20-200 µm], and the lasering spacing [25-200 µm], which corresponds to the spacing between two lines of passage of the laser, which are adjacent and parallel. It is generally less than the diameter of the laser spot in order to obtain an overlap zone.

The invention has been described in relation to a mould of the sectored type. It can also be implemented in relation to a mould of another type.

Tests

In order to validate the invention, the test was carried out on a tyre of standardized size according to ETRTO (ETRTO: European Tyre and Rim Technical Organisation): 13R22.5 TL 156/151 K. The inflation pressure is 875 kilopascals for a load to be carried in individual mounting of 3450 kilos.

The tyre has been tested according to regulation UN/ECE/R117, which relates to the mandatory performance thresholds before marketing of tyres in Europe, issued by the United Nations Economic Commission for Europe (UN/ECE).

The results of the tests carried out relate in this case to grip on wet and snowy ground.

Compared to the control provided by the regulations (SRTT), the tyre of the invention has improved grip performance on wet ground of 120%, and on snow an improvement of 185%.

The invention has been presented for passenger-vehicle and heavy-duty-vehicle tyres, but it can actually be applied to any type of tyre.

The invention claimed is:

1. A tire provided with a tread of which portions of a tread surface that are intended to be in contact with a ground comprise a texture formed by an arrangement of contiguous elements of pyramidal shape, each element of pyramidal shape having a base of parallelogram type positioned on the tread surface, and an apex situated at a radial distance H from the base, the base being defined by:
   a first pair of mutually parallel sides spaced apart from one another by a first pitch P1, and forming an angle alpha with a circumferential direction of the tire; and
   a second pair of mutually parallel sides spaced apart from one another by a second pitch P2, and forming an angle beta with the circumferential direction, a side of the second pair of mutually parallel sides meeting a side of the first pair of mutually parallel sides to form an acute angle, wherein the first pair of parallel sides and the second pair of parallel sides form, at an intersection, vertices of the bases of parallelogram type, constituting a mesh of the portions of the tread surface, wherein the angle alpha is in a range from 15° to 75°, wherein the angle beta is in a range from −75° to −15°, and wherein a normal distance from the apex to the base is in a range from 0.15 mm to 0.5 mm.

2. The tire according to claim 1, wherein the first pitch P1 or the second pitch P2 is constant.

3. The tire according to claim 1, wherein the angle beta is equal in terms of absolute value to the angle alpha.

4. The tire according to claim 1, wherein the first pitch P1 of the first pair of sides is less than or equal to 2*H/Tan (alpha).

5. The tire according to claim 1, wherein the first pitch P2 of the first pair of sides is less than or equal to 2*H/Tan (beta).

6. The tire according to claim 1, wherein the texture of the portions of the tread surface has a density of elements of pyramidal shape that is greater than or equal to 10 elements per square centimeter.

\* \* \* \* \*